United States Patent
Kaneko et al.

(10) Patent No.: US 6,864,938 B2
(45) Date of Patent: Mar. 8, 2005

(54) LIQUID CRYSTAL DISPLAY PANEL AND METHOD OF FABRICATING THE SAME

(75) Inventors: Naomi Kaneko, Kyoto (JP); Hiroshi Satani, Yawata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 136 days.

(21) Appl. No.: 10/139,337

(22) Filed: May 7, 2002

(65) Prior Publication Data

US 2003/0020859 A1 Jan. 30, 2003

(30) Foreign Application Priority Data

May 11, 2001 (JP) ........................................ 2001-141659

(51) Int. Cl.[7] .............................................. G02F 1/1343
(52) U.S. Cl. ...................................... 349/139; 349/138
(58) Field of Search ................................ 349/139, 138, 349/148

(56) References Cited

U.S. PATENT DOCUMENTS

| | | | |
|---|---|---|---|
| 5,122,896 A | * | 6/1992 | Mizusaki et al. ........... 359/273 |
| 5,319,479 A | * | 6/1994 | Yamada et al. ............. 349/138 |
| 5,506,707 A | * | 4/1996 | Segawa ....................... 349/139 |
| 6,310,674 B1 | * | 10/2001 | Suzuki et al. ............... 349/139 |

FOREIGN PATENT DOCUMENTS

JP 07-301789 * 11/1995

* cited by examiner

Primary Examiner—Tarifur R. Chowdhury
Assistant Examiner—Thoi V. Duong
(74) Attorney, Agent, or Firm—McDermott Will & Emery LLP

(57) ABSTRACT

A liquid crystal display panel comprises a liquid crystal layer sandwiched between a first resin substrate and a second resin substrate, a first electrode and a second electrode provided over respective opposed surfaces of the first and second resin substrates, and a first insulating film provided between the first electrode and the liquid crystal layer. The product of the film stress of the first electrode multiplied by the film thickness thereof is smaller than the product of the film stress of the second electrode multiplied by the film thickness thereof.

16 Claims, 3 Drawing Sheets

LIQUID CRYSTAL DISPLAY PANEL AND METHOD OF FABRICATING THE SAME

TECHNICAL FIELD

The present invention relates to liquid crystal panels and a process for producing the panel, and more particularly to a liquid crystal panel wherein two substrates having a liquid crystal layer sandwiched therebetween are resin substrates and a process for producing the same.

BACKGROUND ART

Transparent substrates provided with a transparent electrode over a surface thereof are in wide use for display devices, such as liquid crystal displays and electroluminescence displays, solar cells, etc. Although such transparent substrates are generally glass substrates in the prior art, substrates of polycarbonate or like resin are also known recently. Resin substrates have the characteristics of being lightweight, thin and resistance to breaking which glass substrates fail to possess, and are therefore generally used in portable electronic devices and liquid crystal display devices.

FIG. 4 is a sectional view schematically showing a conventional liquid crystal display panel wherein resin substrates are used. The liquid crystal display panel 101 comprises a first resin substrate 102 provided with a first electrode 103, a second resin substrate 111 provided with a second electrode 112, and a liquid crystal layer 104 sandwiched between the resin substrates 102, 111, with an alignment film 109 formed over each surface of the liquid crystal layer 104. The liquid crystal layer 104 is enclosed with a sealant 110.

The display panel 101 shown in FIG. 4 is in the so-called super-twisted nematic (STN) mode. Stated more specifically, stripes of electrode 103 for displaying images, characters, etc. are arranged in parallel to one another over the surface of the first substrate 102 in contact with the liquid crystal layer 104. On the other hand, similar stripes of electrodes 112 are arranged over the second substrate 111. The electrode 103 over the first substrate 102 and the electrode 112 over the second substrate 111 are so arranged that the stripes of one electrode are approximately orthogonal to those of the other electrode.

The electrode 112 which comprises an indium oxide having, for example, a tin oxide added thereto is formed over the surface of the second substrate 111 closer to the liquid crystal layer 104, and an alignment film 109 comprising, for example, a polyimide is formed over the electrode 112. Formed over the surface of the first substrate 102 in contact with the liquid crystal layer 104 are the electrode 103, which is made from an indium oxide incorporating, for example, a tin oxide, an insulating film 108 consisting mainly of $SiO_x$ and disposed over the electrode, and an alignment film 109 over the insulating film.

In producing such a liquid crystal display panel, an alignment film of polyimide resin or the like is formed over an electrically conductive film which is patterned, and the alignment film is then rubbed in a specified direction with a rubbing roll for rubbing treatment.

The insulating layer 108 is formed to prevent short-circuiting between the electrodes that would occur mainly owing to the presence of extraneous matter between the electrodes during the production of the liquid crystal display panel. This affords the display device in a greatly improved yield.

However, the use of resin substrates as the substrates of the liquid crystal display device involves the problem that the electrodes are liable to develop cracks as described in the following paragraphs (1) to (3).

(1) Resin substrates are greater than glass substrates in coefficient of thermal expansion by at least one order of magnitude, so that the difference between the substrate and the electrode in coefficient of thermal expansion becomes greater when the resin substrate is used than when the glass substrate is used. For this reason, if the resin substrate alters greatly in size in the production process of the display device owing to temperature variations involved in thermal load or in the actual environment for use, the electrode will fail in following the alteration of the resin substrate, so that a great stress occurs in the electrode. The electrode is very thin, low in mechanical strength and therefore susceptible to cracking due to the stress produced. Further various films, such as the insulating film and alignment film, formed over the electrode in superposed layers further increase the stress in the electrode, which in turn becomes more susceptible to cracking.

(2) Resin substrates are smaller than glass substrates in Young's modulus by at least one order of magnitude and have high flexibility. Resin substrates are therefore more resistant to breaking by external forces, but are deformable. When subjected to an external force, the resin substrate accordingly deforms greatly, rendering the electrode liable to cracking.

(3) Resins are generally hygroscopic, and the resin substrate deforms or expands when absorbing moisture, possibly permitting the electrode to develop cracks.

Thus, the resin substrate used for forming the electrode thereon renders the electrode susceptible to cracking. Especially in the case where a resin substrate is used for each of the two substrates for providing the liquid crystal display panel, affixing the substrates to each other restrains the substrates from deforming, with the result that the problem of cracking becomes more pronounced.

An object of the present invention, which has been accomplished to overcome the foregoing problem, is to provide a liquid crystal display panel wherein the electrodes are effectively prevented from breaking due to cracking, and a process for producing the panel.

DISCLOSURE OF THE INVENTION

To fulfill the above object, the present invention provides a liquid crystal display panel comprising a liquid crystal layer sandwiched between a first resin substrate and a second resin substrate, a first electrode and a second electrode provided over respective opposed surfaces of the first and second resin substrates, and a first insulating film provided between the first electrode and the liquid crystal layer, the product of the film stress of the first electrode multiplied by the film thickness thereof being smaller than the product of the film stress of the second electrode multiplied by the film thickness thereof.

In the case where the display panel has a second insulating film provided between the liquid crystal layer and the second electrode, it is desired that the first insulating film be greater than the second insulating film in thickness.

Further preferably, the product of the film stress σ2 of the second electrode multiplied by the film thickness t2 thereof is up to about 100 N/m.

The first electrode may comprise a single layer of electrically conductive film, with the second electrode comprising a multiplicity of layers including an electrically conductive film.

In the case where the first electrode and the second electrode are made from the same material, it is preferred that the first electrode be smaller than the second electrode in thickness.

It is desirable that the first resin substrate and the second resin substrate be made from the same material.

The first resin substrate may be smaller than the second resin substrate in coefficient of thermal expansion.

The liquid crystal display panel described can be produced, for example, by a process for producing a liquid crystal display panel which process comprises the steps of forming a first electrode and a second electrode respectively over a first resin substrate and a second resin substrate, forming a first insulating film over a surface of the first resin substrate having the first electrode thereon, and forming a liquid crystal layer by affixing the first resin substrate and the second resin substrate to each other to sandwich a liquid crystal layer therebetween with the first electrode and the second electrode opposed to each other, the first electrode and the second electrode being formed from the same metal material by forming the metal material into films at different temperatures in the electrode forming step, the product of the film stress of the first electrode multiplied by the film thickness thereof being made smaller than the product of the film stress of the second electrode multiplied by the film thickness thereof.

Alternatively, the liquid crystal display panel described can be produced by a process for producing a liquid crystal display panel which process comprises the steps of forming a first electrode and a second electrode respectively over a first resin substrate and a second resin substrate, forming a first insulating film over a surface of the first resin substrate having the first electrode thereon, and forming a liquid crystal layer by affixing the first resin substrate and the second resin substrate to each other to sandwich a liquid crystal layer therebetween with the first electrode and the second electrode opposed to each other, the first electrode and the second electrode being formed from the same metal material by forming the metal material into films under different pressures in the electrode forming step, the product of the film stress of the first electrode multiplied by the film thickness thereof being made smaller than the product of the film stress of the second electrode multiplied by the film thickness thereof.

The first electrode can be provided by an electrically conductive film exhibiting no diffraction peak when subjected to an X-ray analysis, and the second electrode by an electrically conductive film exhibiting a diffraction peak when subjected to an X-ray analysis.

Preferably, in this case, the first electrode and the second electrode comprise ITO. Further preferably, the first electrode is higher than the second electrode in the concentration of a tin oxide contained therein.

Such a liquid crystal display panel can be produced, for example, by a process for producing a liquid crystal display panel which process comprises the steps of forming a first electrode over a first resin substrate, forming a second electrode over a second resin substrate, forming a first insulating film over a surface of the first resin substrate having the first electrode thereon, and forming a liquid crystal layer by affixing the first resin substrate and the second resin substrate to each other to sandwich a liquid crystal layer therebetween with the first electrode and the second electrode opposed to each other, the first electrode exhibiting no diffraction peak when subjected to an X-ray analysis and being formed by maintaining an electrically conductive film of ITO in an amorphous state in the first electrode forming step, the second electrode exhibiting a diffraction peak when subjected to an X-ray analysis and being formed by crystallizing an electrically conductive film of ITO in the second electrode forming step, the product of the filmstress of the first electrode multiplied by the film thickness thereof being made smaller than the product of the film stress of the second electrode multiplied by the film thickness thereof.

Each of the foregoing processes for producing a liquid crystal display panel may further comprise the step of forming a second insulating film having a smaller thickness than the first insulating film over a surface of the second resin substrate having the second electrode thereon.

BEST MODE OF CARRYING OUT THE INVENTION

Figure 1:
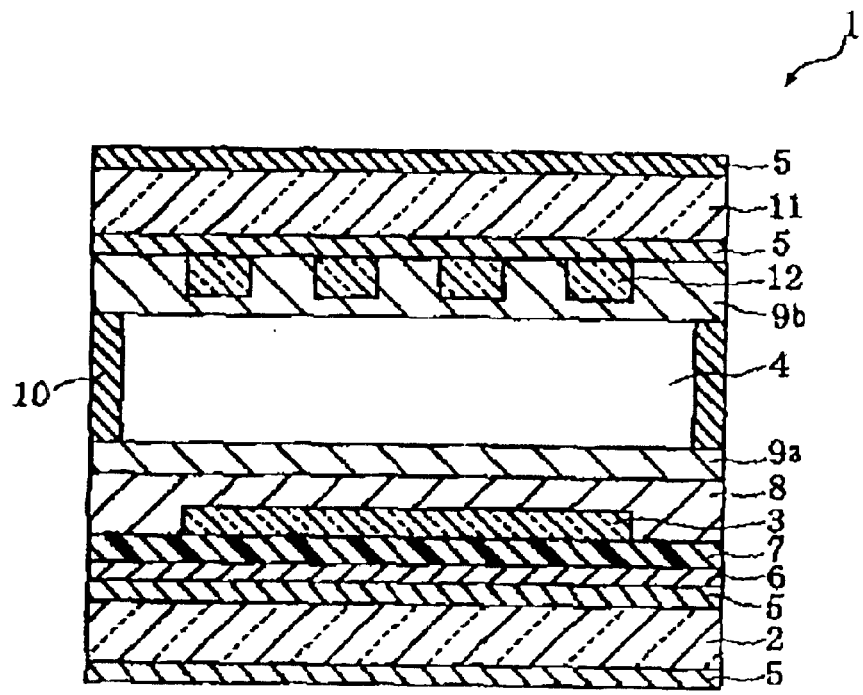
FIG. 1 is a sectional view schematically showing a liquid crystal display panel according to an embodiment of the invention.

Embodiments of the present invention will be described below with reference to the drawings. FIG. 1 is a sectional view schematically showing a liquid crystal display panel according to an embodiment of the invention. The display panel according to this embodiment is a passive matrix semitransparent liquid crystal display panel. It is also possible to apply the present invention to active matrix liquid crystal display panels.

With reference to FIG. 1, the liquid crystal display panel 1 comprises a first resin substrate 2 and a second resin substrate 11, which are arranged as opposed to each other with a spacer 10 interposed therebetween. As shown in FIG. 1, a gas barrier film 5 comprising a silicon oxide or aluminum oxide, or a metal such as aluminum or silver may be provided on each surface of each of the first resin substrate 2 and the second resin substrate 11.

A liquid crystal layer 4 is sandwiched between the first resin substrate 2 and the second resin substrate 11. Examples of liquid crystal materials usable are nematic liquid crystals, chiral nematic liquid crystals, chiral smectic liquid crystals, cholesteric liquid crystals, etc.

Formed over the surface of the first resin substrate 2 opposed to the other substrate are a semitransparent layer 6, a color filter 7 and a first electrode 3 in superposed layers. A second electrode 12 is formed over the opposed surface of the second resin substrate 11. The first electrode 3 and the second electrode 12 are each provided in the form of stripes, and these electrodes are approximately orthogonal with respect to the directions of their stripes.

Alignment films 9a, 9b are formed on the outermost surfaces of the first resin substrate 2 and the second resin substrate 11 which surfaces are opposed each other. The alignment films 9a, 9b are made, for example, from a polyimide resin and aligned by rubbing or optical alignment method. The alignment films need not always be provided if the liquid crystal can be aligned without using the alignment films.

A first insulating film 8 is provided between the first electrode 3 and the alignment film 9a. The first insulating film 8 serves to prevent short-circuiting between the first electrode 3 and the second electrode 12. The film 8 to be used consists mainly of an inorganic material such as $SiO_x$ or an organic material such as an epoxy resin. The relationship between the first insulating film and film stress will be described later.

Figure 2:
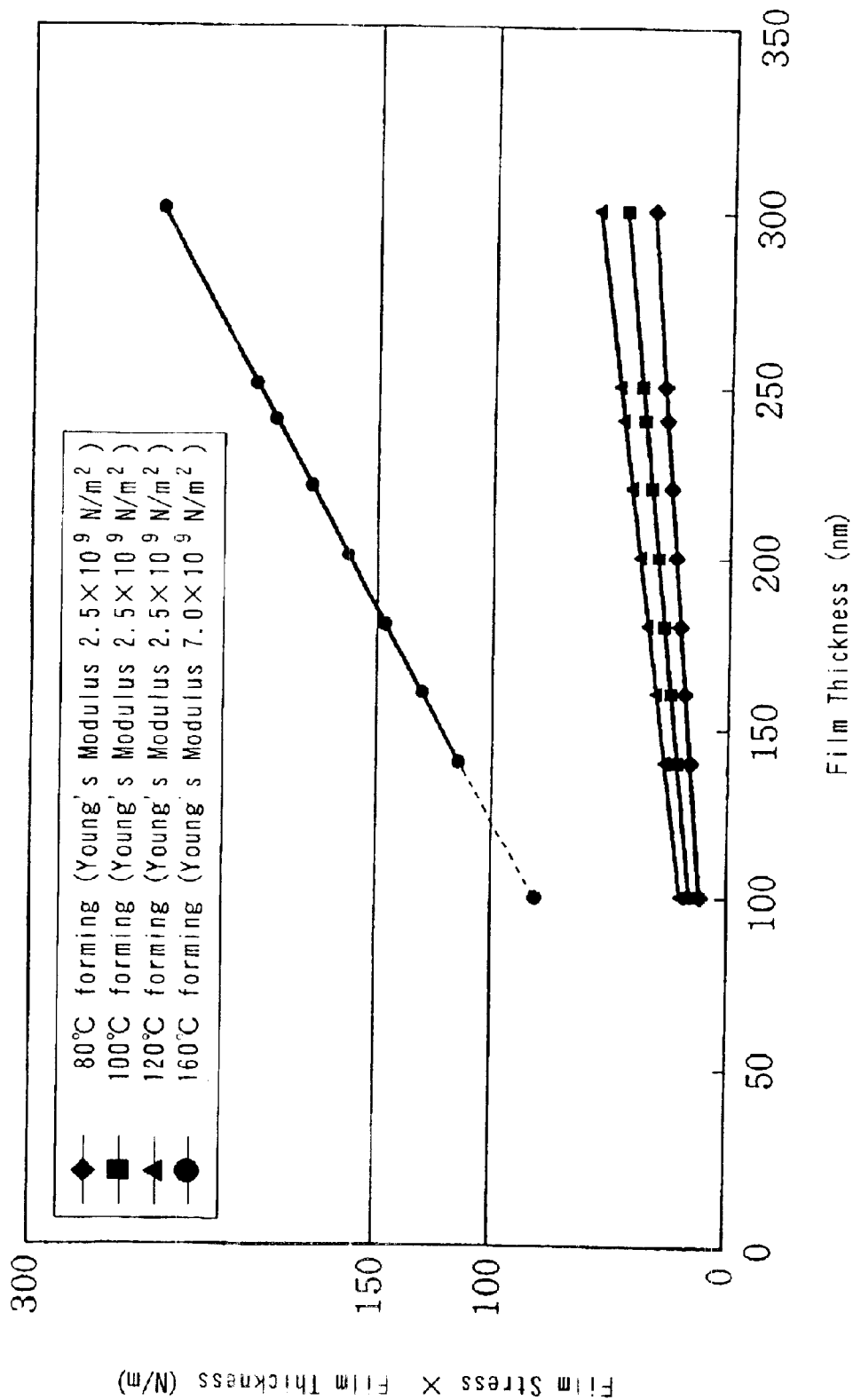
FIG. 2 is a graph showing an example of relationship between the film thickness of ITO electrode and the product of the film stress of the electrode multiplied by the film thickness thereof.
Figure 4:
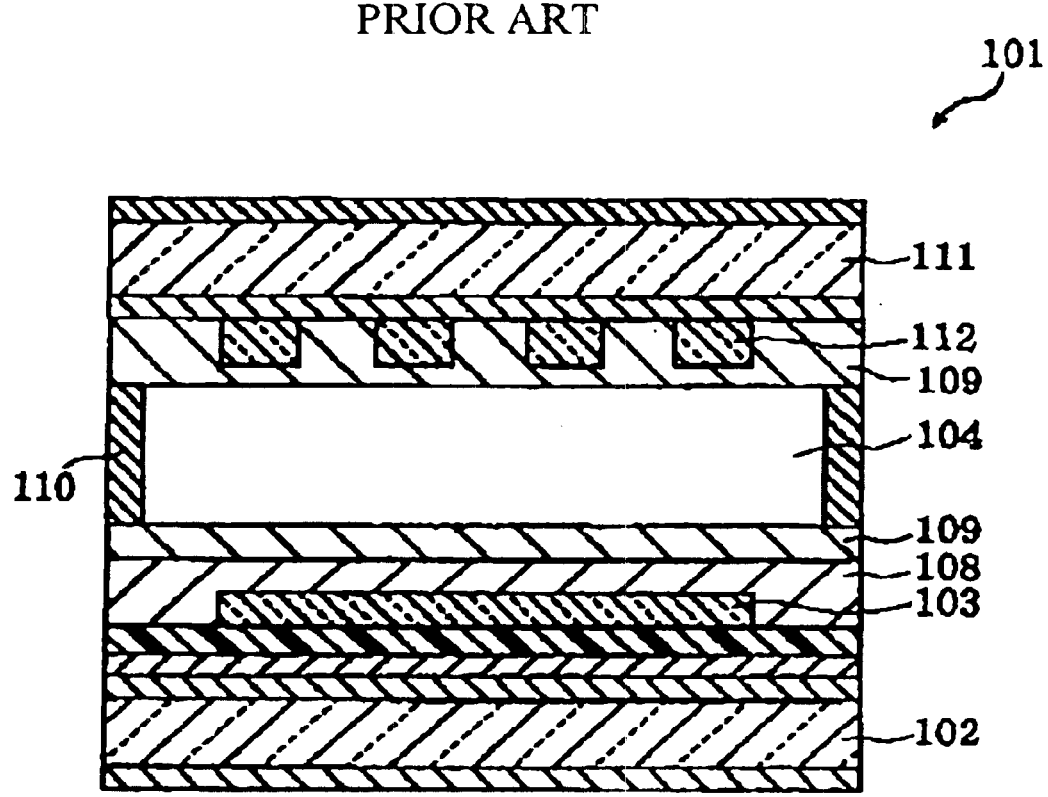
FIG. 4 is a sectional view schematically showing a conventional liquid crystal display panel.

With the liquid crystal display panel of the construction described above, we have found, for example by experiments, that the film stress of the electrode formed over the resin substrate multiplied by the film thickness thereof has a close relationship with cracking. FIG. 2 is a graph showing an example of relationship between the film thickness of an ITO electrode and the product of the film stress of the electrode multiplied by the film thickness thereof. The product of the film stress of the electrode multiplied by the film thickness thereof increases at an approximately constant rate with an increase in the film thickness when the film thickness is in the range of 100 to 300 nm.

With reference to FIG. 2. the product of the film stress of the electrode multiplied by the film thickness thereof increases at an exceedingly higher rate relative to the film thickness when the film forming temperature is 160° C. than at the other film forming temperatures. This is because the increase of the film forming temperature changes the electrode film from an amorphous form to a crystalline form to result in an increase in Young's modulus. The graph showing the relationship under this particular film forming temperature condition partly includes a broken line, which indicates that the electrode developed cracks at this portion. The measurements obtained by us under other conditions as to the film thickness, etc. reveal that the electrode is liable to develop cracks and fractures if the product of the film stress of the electrode by the film thickness thereof exceeds about 100 N/m. Accordingly, in order to effectively prevent the first electrode 3 and the second electrode 12 from cracking, it is desirable that the product of the film stress of each electrode multiplied by the film thickness thereof be up to about 100 N/m. The lower limit value of the product of the film stress of the electrode multiplied by the film thickness thereof is, for example, about 1 N/m although not limited specifically.

The product of the film stress of the electrode multiplied by the film thickness thereof can be readily determined from the following equation instead of directly measuring the particular values.

(Mathematical Expression 1)

$$\sigma = Ah^2/6Rt$$

wherein σ: film stress of the electrode, t: thickness of the electrode, A: Young's modulus of the resin substrate, h: thickness of the resin substrate, R: radius of curvature of the resin substrate.

Thus, when Young's modulus A and the thickness h of the resin substrate are found, and if the radius of curvature of the resin substrate actually provided with the electrode is measured, the product of the film stress σ of the electrode multiplied by the film thickness t thereof can be determined. According to the present invention, the thickness and the radius of curvature of the resin substrate are measured after allowing the substrate to stand at 25° C. and 50% RH for 24 hours.

If the deformation of one of the first and resin substrates is exceedingly greater than that of the other, with the two substrates affixed to each other, one of the substrates is restrained from deforming to exhibit a greater radius of curvature, consequently increasing the product of the film stress a of the electrode multiplied by the film thickness t thereof.

In order to avoid any great difference between the first and second resin substrates 2, 11 in deformation according to the present embodiment, therefore, the components of the panel are designed with consideration given to the thicknesses and Young's moduli of the substrates, the material and film thicknesses of the electrodes, film forming conditions, etc. so that the product of the film stress σ1 of the first electrode 3 multiplied by the film thickness t1 thereof will be smaller than the product of the film stress σ2 of the second electrode 12 multiplied by the film thickness t2 thereof, with the first resin substrate 2 and the second resin substrate 11 in a separate state. The thickness of the first electrode 3 or the second electrode 12 is preferably in the range of 50 to 300 nm, more preferably 100 to 200 nm, although not limited particularly.

The product of the film stress σ1 of the first electrode 3 multiplied by the film thickness t1 thereof is made smaller according to the present invention, because consideration is given to the film stress of the first electrode 3 that is increased by forming the insulating film 8 over the first resin substrate 2. More specifically, even in the case where layers other than the insulating film are formed over the substrate, it is mainly the insulating layer that restrains the deformation of the electrode, so that the product of the film stress of the electrode, over which the insulating layer is to be provided, multiplied by the film thickness thereof is made smaller than the product of the film stress of the other electrode multiplied by the film thickness thereof. This maintains a balance of deformation between the first and second resin substrates 2, 11, effectively preventing the first electrode 3 or the second electrode 12 from cracking.

Figure 3:
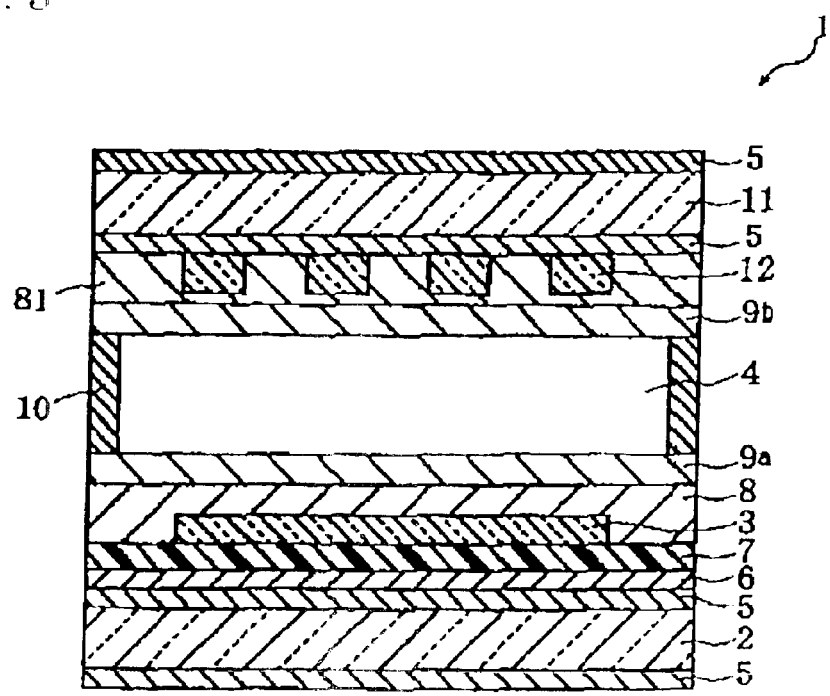
FIG. 3 is a sectional view schematically showing a liquid crystal display panel according to another embodiment of the invention.

Since the insulating layer formed increases the film stress, it is desirable that the second resin substrate 11 to be provided with the other electrode (i.e., the second electrode 12) be provided with no insulating film between the alignment film 9b and the second electrode 12 as shown in FIG. 1. However, the insulating layer may be provided not only over the first resin substrate 2 but also over the second resin substrate 11 insofar as the product of the film stress of one of the electrodes (i.e., the first electrode 3), over which the insulating layer is to be provided, multiplied by the film thickness thereof is made smaller than the product of the film stress of the other electrode (i.e., the second electrode 12) multiplied by the film thickness thereof. Thus, a second insulating film 81 may be formed further between the alignment film 9b and the second electrode 12 as shown in FIG. 3. In this case, it is desired that the first insulating film 8 formed over the first electrode 3 which is the smaller in the product of the film stress by the film thickness be greater than the second insulating film 81 in thickness in view of the influences to be exerted by the first and second insulating films 8, 81 on the respective film stresses of the first and second electrodes 3, 12. Further in this case, it is preferred that both the first and second electrodes 3, 12 be up to 100 N/m in the product of the film stress by the film thickness for the same reason as given below. In FIGS. 1 and 3, like parts are designated by like reference numerals and accordingly will not be described repeatedly except for the second insulating film 81.

The resin to be used for the first resin substrate 2 and the second resin substrate 11 of the liquid crystal display panel 1 is a known resin such as a resin selected from the group consisting of acrylic resin, epoxy resin, silicone resin, polyimide resin, polycarbonate resin, polyvinyl alcohol resin, polyethylene resin and copolymers of such resins. Especially desirable are resins having heat resistance at not lower than 100° C. and optically isotropic. Preferably, the first and second resin substrates 2, 11 are small in coefficient of thermal expansion, whereas even if the coefficient of thermal expansion or Young's modulus of the resin substrate is not smaller than five times the coefficient of thermal expansion or Young's modulus of the electrode, such resin substrate is usable for the present invention. The first and second resin substrates 2, 11 may be different from each other in the resin material used, but it is desirable to use the same material to minimize the difference therebetween in the amount of deformation due to thermal expansion.

Usable as the first electrode 3 and the second electrode 12 are transparent electrically conductive films prepared from a metallic oxide such as ITO (indium-tin-oxide), zinc oxide, tin oxide, titanium oxide or zirconium oxide. The first electrode 3 and the second electrode 12 may be prepared from different materials but are preferably made from the same material. This readily makes it possible to render the product of the film stress of the first electrode 3 by the film thickness thereof smaller than the product of the film stress of the second electrode 12 by the film thickness thereof, by giving the first electrode a smaller thickness than the second electrode.

The electrode can be not only in the form of a single layer of electrically conductive film but also in the form of a multiplicity of layers including conductive films, such as a structure of superposed layers, e.g., a metallic oxide film and a silicon oxide film. In this case, the multilayered structure is susceptible to warping or like deformation owing to the difference between the layers, for example, in Young's modulus to increase the product of the film stress of the electrode by the film thickness thereof. Accordingly, by providing the first electrode 3 by a single layer, and the second electrode 12 by a multiplicity of layers, the product of the film stress of the first electrode 3 multiplied by the film thickness thereof can be easily made smaller than the product of the film stress of the second electrode 12 multiplied by the film thickness thereof.

The first electrode 3 may be a conductive film of amorphous material, and the second electrode 12 a conductive film of crystalline material. The conductive film of amorphous material is smaller than the conductive film of crystalline material in Young's modulus and film stress. The product of the film stress of the first electrode 3 multiplied by the film thickness thereof can therefore be easily made smaller than the product of the film stress of the second electrode 12 multiplied by the film thickness thereof, by preparing the electrodes from the respective materials. Whether the conductive film is amorphous or crystalline can be readily determined by using an X-ray diffraction measuring instrument; the film is amorphous when having no X-ray peak, but is crystalline when having an X-ray peak.

When ITO is made into a conductive film at a temperature not higher than a predetermined level, the material remains almost free of crystallization, whereas if the predetermined temperature is exceeded, the material crystallizes rapidly. Thus, amorphous or crystalline conductive films can be formed readily.

Further in the case of conductive films of ITO, the material becomes more difficult to crystallize, with an amorphous state maintained with greater ease, as the concentration of tin oxide increases, so that the product of the film stress of the first electrode 3 multiplied by the film thickness thereof can be made smaller than the product of the film stress of the second electrode 12 multiplied by the film thickness thereof with greater ease by giving a higher tin oxide content to the first electrode 3 than to the second electrode 12.

The liquid crystal display panel 1 described can be produced in the following manner.

A transparent electrode material such as ITO is made into a film by vacuum evaporation, sputtering, CVD or like process over a first resin substrate 2 and a second resin substrate 11 which are cleaned, followed by patterning by photolithography or etching to make a first electrode 3 and a second electrode 12.

Subsequently, a first insulating film 8 is formed over the first electrode 3 by CVD or like process or by coating as by spin coating.

A spacer 10, such as plastic beads or the like, is then uniformly applied to one of the first resin substrate 2 and second resin substrate 11, a liquid crystal material is thereafter applied dropwise to the substrate, and the two substrates 2, 11 are affixed to each other at their peripheral portions with a sealant, with the first and second electrodes 3, 12 opposed to each other, whereby a liquid crystal display panel 1 is completed in which a liquid crystal layer 4 is sandwiched between the first and second resin substrates 2, 11. The liquid crystal layer 4 can be formed alternatively by vacuum-injecting the liquid crystal material into a space between the first and second resin substrates 2, 11 as affixed to each other.

Although not described in detail, the semitransparent layer 6, color filter 7, and alignment films 9a, 9b shown in FIG. 1 can be formed by known methods.

In the process for producing the liquid crystal display panel, the step of forming the first electrode 3 and the second electrode 12 is important. If the film forming temperature is higher in forming the electrode, the film stress of the electrode increases to increase the product of the film stress of the electrode multiplied by the film thickness thereof (see FIG. 1). On the other hand, an increase in the film forming pressure decreases the film stress of the electrode to diminish the product of the film stress of the electrode multiplied by the film thickness thereof.

As a film forming condition, therefore, it is desirable to form the first electrode 3 at a lower film forming temperature than the second electrode 12. Alternatively, it is desirable to form the first electrode 3 under a higher film forming pressure than the second electrode 12. These conditions, i.e., the film forming temperature and the film forming pressure, may of course be used in combination. In this way, the product of the film stress of the first electrode 3 multiplied by the film thickness thereof can be easily made smaller than the product of the film stress of the second electrode 12 multiplied by the film thickness thereof.

In the case where the formation of the electrode is followed by the step of heating such as annealing, it is desirable to maintain the first electrode 3 in an amorphous state. On the other hand, it is desirable to crystallize the second electrode 12 by the film forming step or the following step. In this way, the product of the film stress of the first electrode 3 multiplied by the film thickness thereof can be readily made smaller than the product of the film stress of the second electrode 12 multiplied by the film thickness thereof.

The present invention will be described below in greater detail with reference to Examples.

EXAMPLE 1

Liquid crystal panels of the construction shown in FIG. 1 were prepared wherein the first and second resin substrates 2, 11 and the first and second electrodes 3, 12 were formed using different materials and giving varying coefficients of thermal expansion, Young's moduli and film thicknesses to these components. The panels were checked for the influence of these varying factors on the cracking of the electrodes. Table 1 shows the liquid crystal display panels A to F checked.

TABLE 1

| | First Substrate | | | | | | | | | | Second Substrate | | | | | | | | | |
|---|---|---|---|---|---|---|---|---|---|---|---|---|---|---|---|---|---|---|---|---|
| | First Resin Substrate | | | | First Electrodes | | | | | | Second Resin Substrate | | | | Second Electrodes | | | | | |
| | | | | | | | | | FS | FS × | | | | | | | | | FS | FS × |
| | | | | | | | | | (MPa) | FT | | | | | | | | | (MPa) | FT |
| Panel | M | TEC ($K^{-1}$) | YM ($N/m^2$) | FT (mm) | M | TEC ($K^{-1}$) | YM ($N/m^2$) | FT (mm) | | (N/m) | M | TEC ($K^{-1}$) | YM ($N/m^2$) | FT (mm) | M | TEC ($K^{-1}$) | YM ($N/m^2$) | FT (mm) | | (N/m) |
| A | AC | $6.6 \times 10^{-5}$ | $4 \times 10^9$ | 0.4 | ZnO | $1.0 \times 10^{-6}$ | $4 \times 10^{10}$ | 90 | 220 | 19.8 | | AC | $6.6 \times 10^{-5}$ | $4 \times 10^9$ | 0.4 | ITO | $1.0 \times 10^{-6}$ | $7 \times 10^{10}$ | 650 300 | 195 |
| B | AC | $6.6 \times 10^{-5}$ | $4 \times 10^9$ | 0.4 | *1 | $1.0 \times 10^{-6}$ | $2.5 \times 10^{10}$ | 130 350 | | 45.5 | AC | $6.6 \times 10^{-5}$ | $4 \times 10^9$ | 0.4 | *4 | $1.0 \times 10^{-6}$ | $2.5 \times 10^{10}$ | 250 260 | | 65 |
| C | PC | $3.0 \times 10^{-6}$ | $3 \times 10^{10}$ | 0.7 | ITO | $2.0 \times 10^{-6}$ | $4 \times 10^{10}$ | 150 180 | | 27 | PC | $3.0 \times 10^{-6}$ | $3 \times 10^{10}$ | 0.7 | *5 | $2.0 \times 10^{-6}$ | $4 \times 10^{10}$ | 400 160 | | 64 |
| D | AC | $6.6 \times 10^{-5}$ | $4 \times 10^9$ | 0.3 | *2 | $1.0 \times 10^{-6}$ | $4 \times 10^{10}$ | 180 140 | | 25.2 | AC | $6.6 \times 10^{-5}$ | $4 \times 10^9$ | 0.3 | *1 | $1.0 \times 10^{-6}$ | $4 \times 10^{10}$ | 150 250 | | 37.5 |
| E | AC | $6.6 \times 10^{-5}$ | $4 \times 10^9$ | 0.4 | *3 | $1.0 \times 10^{-6}$ | $4 \times 10^{10}$ | 150 240 | | 36 | AC | $6.6 \times 10^{-5}$ | $4 \times 10^9$ | 0.4 | *6 | $1.0 \times 10^{-6}$ | $7 \times 10^{10}$ | 600 160 | | 96 |
| F | AC | $6.6 \times 10^{-5}$ | $4 \times 10^9$ | 0.4 | ITO | $1.0 \times 10^{-6}$ | $7 \times 10^{10}$ | 150 240 | | 36 | AC | $6.6 \times 10^{-5}$ | $4 \times 10^9$ | 0.4 | ZnO | $1.0 \times 10^{-6}$ | $4 \times 10^{10}$ | 90 220 | | 19.8 |

M: Material, TEC: Thermal Expansion Coefficient, YM: Young's Modulus, FT: Film Thickness, FS: Film Stress
AC: ACrylic acid resin, PC: PolyCarbonate
*1: ITO (Film Forming Temperature: 100° C., Film Forming Pressure: 0.6665 Pa)
*2: ITO (Film Forming Temperature: 120° C., Film Forming Pressure: 0.6665 Pa)
*3: ITO ($SnO_2$: 10 wt %)
*4: ITO (Film Forming Temperature: 100° C., Film Forming Pressure: 0.3999 Pa)
*5: SiOx/TiOx/ZrOx
*6: ITO ($SnO_2$: 5 wt %)
Panel E: First Electrodes (Amorphous), Second Electrodes (Crystalline)

Table 1 shows that with the panels A to E, the product of the film stress of the first resin substrate 2 multiplied by the film thickness thereof was smaller than the product of the film stress of the second resin substrate 11 multiplied by the film thickness thereof. With the panel F, on the other hand, the product of the film stress of the first resin substrate 2 multiplied by the film thickness thereof was greater than the product of the film stress of the second resin substrate 11 multiplied by the film thickness thereof.

These liquid crystal display panels A to F were allowed to stand in an atmosphere having a humidity of 90% RH and a temperature of 60° C. for 1000 hours and thereafter checked for cracking in the first electrodes 3 or second electrodes 12. The panels were thereafter allowed to stand in an atmosphere having a humidity of 85% RH and a temperature of 85° C. further for 1000 hours and then similarly checked for cracking. The panels were also subjected to 300 cycles of thermal shock test wherein each panel was held at 80° C. for 30 min and at −20° C. for 30 min as each cycle, and thereafter checked for cracking. Table 2 shows the results.

TABLE 2

| | Reliability (High Humidity Test) | | |
|---|---|---|---|
| Panel | Temp. 60° C. Humid. 90% 1000 hours | Temp. 80° C. Humid. 80% 1000 hours | Thermal Shock Test |
| A | No Cracking | No Cracking | No Cracking |
| B | No Cracking | No Cracking | No Cracking |
| C | No Cracking | No Cracking | No Cracking |
| D | No Cracking | No Cracking | No Cracking |
| E | No Cracking | No Cracking | No Cracking |
| F | Cracking | Cracking | Cracking |

Table 2 reveals that no cracking was found under any of the three test conditions in the panels A to E wherein the product of the film stress of the first resin substrate 2 multiplied by the film thickness thereof was smaller than the product of the film stress of the second resin substrate 11 multiplied by the film thickness thereof, hence satisfactory results. On the other hand, cracking occurred under all the test conditions in the panel F wherein the product of the film stress of the first resin substrate 2 multiplied by the film thickness thereof was greater than the product of the film stress of the second resin substrate 11 multiplied by the film thickness thereof.

EXAMPLE 2

Liquid crystal panels of the construction shown in FIG. 1 were prepared wherein the first and second electrodes 3, 12 were made from the same materials, and checked for the influence of varying film thicknesses of these electrodes on the cracking in the electrodes. Table 3 shows the liquid crystal display panels H to N checked.

TABLE 3

| | First Substrate | | | | | | | Second Substrate | | | | | | |
|---|---|---|---|---|---|---|---|---|---|---|---|---|---|---|
| | First Resin Substrate | | First Electrodes | | | | | Second Resin Substrate | | Second Electrodes | | | | |
| | | | | | | FS (MPa) FT (mm) | | | | | | | FS (MPa) FT (mm) | |
| Panel | M | TEC ($K^{-1}$) | YM ($N/m^2$) | M | TEC ($K^{-1}$) | YM ($N/m^2$) | FS × FT (N/m) | M | TEC ($K^{-1}$) | YM ($N/m^2$) | M | TEC ($K^{-1}$) | YM ($N/m^2$) | FS × FT (N/m) |
| H | AC | $6.6 \times 10^{-5}$ | $4 \times 10^9$ | ITO | $1.0 \times 10^{-6}$ | $4 \times 10^{10}$ | 95 180 17.1 | AC | $6.6 \times 10^{-5}$ | $4 \times 10^9$ | ITO | $1.0 \times 10^{-6}$ | $4 \times 10^{10}$ | 95 200 19 |
| I | AC | $6.6 \times 10^{-5}$ | $4 \times 10^9$ | ITO | $1.0 \times 10^{-6}$ | $2.5 \times 10^{10}$ | 90 250 22.5 | AC | $6.6 \times 10^{-5}$ | $4 \times 10^9$ | ITO | $1.0 \times 10^{-6}$ | $2.5 \times 10^{10}$ | 90 300 27 |
| J | AC | $6.6 \times 10^{-5}$ | $4 \times 10^9$ | ITO | $2.0 \times 10^{-6}$ | $4 \times 10^{10}$ | 90 260 23.4 | AC | $3.0 \times 10^{-6}$ | $3 \times 10^{10}$ | ITO | $2.0 \times 10^{-6}$ | $4 \times 10^{10}$ | 90 300 27 |
| K | AC | $6.6 \times 10^{-5}$ | $4 \times 10^9$ | ITO | $1.0 \times 10^{-6}$ | $4 \times 10^{10}$ | 90 250 22.5 | AC | $6.6 \times 10^{-5}$ | $3 \times 10^9$ | ITO | $1.0 \times 10^{-6}$ | $4 \times 10^{10}$ | 90 350 31.5 |
| L | SR | $3.0 \times 10^{-6}$ | $3 \times 10^{10}$ | ITO | $2.0 \times 10^{-6}$ | $4 \times 10^{10}$ | 90 260 23.4 | PC | $3.6 \times 10^{-5}$ | $4 \times 10^9$ | ITO | $2.0 \times 10^{-6}$ | $4 \times 10^{10}$ | 90 300 27 |
| M | EP | $5.0 \times 10^{-5}$ | $7 \times 10^9$ | ITO | $9.3 \times 10^{-7}$ | $2.6 \times 10^{10}$ | 100 260 26 | EP | $5.0 \times 10^{-5}$ | $7 \times 10^9$ | ITO | $9.3 \times 10^{-7}$ | $2.6 \times 10^{10}$ | 100 300 30 |
| N | AC | $6.6 \times 10^{-5}$ | $4 \times 10^9$ | ITO | $1.0 \times 10^{-6}$ | $4 \times 10^{10}$ | 90 350 31.5 | AC | $6.6 \times 10^{-5}$ | $4 \times 10^9$ | ITO | $1.0 \times 10^{-6}$ | $4 \times 10^{10}$ | 90 250 22.5 |

M: Material, TEC: Thermal Expansion Coefficient, YM: Young's Modulus, FT: Film Thickness, FS: Film Stress
AC: ACrylic acid resin, PC: PolyCarbonate, SR: Silicone Ladder, EP: EPoxy As shown in Table 3, the first electrode 3 was made smaller than the second electrode 12 in film thickness in the case of the panels H to M. With the panel N, on the other hand, the first electrode 3 was made greater than the second electrode 12 in film thickness.

These liquid crystal display panels H to N were allowed to stand in an atmosphere having a humidity of 90% RH and a temperature of 60° C. for 1000 hours and thereafter checked for cracking in the first electrodes 3 or second electrodes 12. The panels were thereafter allowed to stand in an atmosphere having a humidity of 85% RH and a temperature of 85° C. further for 1000 hours and then similarly checked for cracking. The panels were also subjected to 300 cycles of thermal shock test wherein each panel was held at 80° C. for 30 min and at −20° C. for 30 min as each cycle, and thereafter checked for cracking. Table 4 shows the results.

TABLE 4

| | Reliability (High Humidity Test) | | |
|---|---|---|---|
| Panel | Temp. 60° C. Humid. 90% 1000 hours | Temp. 80° C. Humid. 80% 1000 hours | Thermal Shock Test |
| H | No Cracking | No Cracking | No Cracking |
| I | No Cracking | No Cracking | No Cracking |
| J | No Cracking | No Cracking | No Cracking |
| K | No Cracking | No Cracking | No Cracking |
| L | No Cracking | No Cracking | No Cracking |
| M | No Cracking | No Cracking | No Cracking |
| N | Cracking | Cracking | Cracking |

Table 4 reveals that no cracking was found under any of the three test conditions in the panels H to M wherein the first electrode 3 was smaller than the second electrode 12 in film thickness, hence satisfactory results. On the other hand, cracking occurred under all the test conditions in the panel N wherein the first electrode 3 was greater than the second electrode 12 in film thickness. Incidentally, Example 2 revealed that cracking can be prevented reliably in the case where the first electrode 3 is up to 300 nm in film thickness.

EXAMPLE 3

Liquid crystal display panels of the construction shown in FIG. 1 were prepared, in which the first and second electrodes 3, 12 were an amorphous ITO film and a crystalline ITO film, respectively, or a crystalline ITO film and an amorphous ITO film, respectively. The panels were checked for the resulting influence on the cracking of the electrodes. The panels O, P checked are shown in Table 5. Whether the film was amorphous or crystalline was determined by checking the presence or absence of a diffraction peak by an X-ray analysis.

TABLE 5

| | First Substrate | | | | | | | | Second Substrate | | | | | | | |
|---|---|---|---|---|---|---|---|---|---|---|---|---|---|---|---|---|
| | First Resin Substrate | | | First Electrodes | | | | | Second Resin Substrate | | | Second Electrodes | | | | |
| | | | | | | | FS (MPa) | FS × FT | | | | | | | FS (MPa) | FS × FT |
| Panel | M | TEC ($K^{-1}$) | YM ($N/m^2$) | FT (mm) | M | TEC ($K^{-1}$) | YM ($N/m^2$) | FT (mm) | (N/m) | M | TEC ($K^{-1}$) | YM ($N/m^2$) | FT (mm) | M | TEC ($K^{-1}$) | YM ($N/m^2$) | FT (mm) | (N/m) |
| O | AC | $6.6 \times 10^{-5}$ | $4 \times 10^9$ | 0.4 | *1 | $1.0 \times 10^{-6}$ | $2.5 \times 10^{10}$ | 150 | 240 | 36 | AC | $6.6 \times 10^{-5}$ | $4 \times 10^9$ | 0.4 | *2 | $1.0 \times 10^{-6}$ | $7.5 \times 10^{10}$ | 650 | 160 | 104 |
| P | AC | $6.6 \times 10^{-5}$ | $4 \times 10^9$ | 0.4 | *2 | $1.0 \times 10^{-6}$ | $7.5 \times 10^{10}$ | 650 | 160 | 104 | AC | $6.6 \times 10^{-5}$ | $4 \times 10^9$ | 0.4 | *1 | $1.0 \times 10^{-6}$ | $2.5 \times 10^{10}$ | 150 | 240 | 36 |

*1: ITO ($SnO_2$: 10 wt %), *2: ITO ($SnO_2$: 5 wt %),
Panel O: First Electrodes (Amorphous), Second Electrodes (Crytalline)
Panel P: First Electrodes (Crystalline), Second Electrodes (Amorphous)

Table 5 shows that with the panel O, the first electrode 3 was further given a higher tin oxide content than the second electrode 12. In the case of the panel P, on the other hand, a lower tin oxide content was given to the first electrode 3 than to the second electrode 12.

These liquid crystal display panels O, P were allowed to stand in an atmosphere having a humidity of 90% RH and a temperature of 60° C. for 1000 hours and thereafter checked for cracking in the first electrodes 3 or second electrodes 12. The panels were thereafter allowed to stand in an atmosphere having a humidity of 85% RH and a temperature of 85° C. further for 1000 hours and then similarly checked for cracking. The panels were also subjected to 300 cycles of thermal shock test wherein each panel was held at 80° C. for 30 min and at −20° C. for 30 min as each cycle, and thereafter checked for cracking. Table 6 shows the results.

TABLE 6

| | Reliability (High Humidity Test) | | |
|---|---|---|---|
| Panel | Temp. 60° C. Humid. 90% 1000 hours | Temp. 80° C. Humid. 80% 1000 hours | Thermal Shock Test |
| O | No Cracking | No Cracking | No Cracking |
| P | Cracking | Cracking | Cracking |

Table 6 reveals that no cracking was found under any of the three test conditions in the panel O wherein the first electrode 3 was made from amorphous ITO and given a relatively higher tin oxide content, hence a satisfactory result. On the other hand, cracking occurred under all the test conditions in the panel P wherein the first electrode 3 was made from a crystalline ITO and given a relatively lower tin oxide content.

EXAMPLE 4

Liquid crystal display panels of the construction shown in FIG. 1 were prepared in which the first and second resin substrates 2, 11 were given varying coefficients of thermal expansion. The panels were checked for the influence of the variations in the coefficient on the cracking of the electrodes. Table 7 shows the panels Q to S checked.

TABLE 7

| | First Substrate | | | | | | | | | Second Substrate | | | | | | | |
|---|---|---|---|---|---|---|---|---|---|---|---|---|---|---|---|---|---|
| | First Resin Substrate | | | First Electrodes | | | | | | Second Resin Substrate | | | Second Electrodes | | | | |
| | | | | | | | FS (MPa) | | | | | | | | FS (MPa) | | |
| Panel | M | TEC ($K^{-1}$) | YM ($N/m^2$) | M | TEC ($K^{-1}$) | YM ($N/m^2$) | FT (mm) | FS × FT (N/m) | | M | TEC ($K^{-1}$) | YM ($N/m^2$) | M | TEC ($K^{-1}$) | YM ($N/m^2$) | FT (mm) | FS × FT (N/m) |
| Q | PC | $1.2 \times 10^{-5}$ | $4 \times 10^9$ | ITO | $1.0 \times 10^{-6}$ | $4 \times 10^{10}$ | 60 300 | 18 | | EP | $8.0 \times 10^{-5}$ | $4.5 \times 10^9$ | ITO | $1.0 \times 10^{-6}$ | $4 \times 10^{10}$ | 95 300 | 28.5 |
| R | GR | $3.3 \times 10^{-7}$ | $4 \times 10^{11}$ | ITO | $1.0 \times 10^{-6}$ | $4 \times 10^{10}$ | 65 450 | 29.3 | | PC | $1.2 \times 10^{-5}$ | $4 \times 10^9$ | ITO | $1.0 \times 10^{-6}$ | $4 \times 10^{10}$ | 60 300 | 18 |
| S | EP | $8.0 \times 10^{-5}$ | $4.5 \times 10^9$ | ITO | $1.0 \times 10^{-6}$ | $4 \times 10^{10}$ | 95 300 | 28.5 | | PC | $1.2 \times 10^{-5}$ | $4 \times 10^9$ | ITO | $2.0 \times 10^{-6}$ | $4 \times 10^{10}$ | 60 300 | 18 |

PC: PolyCarbonate, EP: EPoxy resin, GR: Glass

Table 7 indicates that with the liquid crystal display panels Q, R, the first resin substrate 2 was made smaller than the second resin substrate 11 in coefficient of thermal expansion. With the panel S, the first resin substrate 2 was made greater than the second resin substrate 11 in coefficient of thermal expansion These liquid crystal display panels Q to S were allowed to stand in an atmosphere having a humidity of 90% RH and a temperature of 60° C. for 1000 hours and thereafter checked for cracking in the first electrodes 3 or second electrodes 12. The panels were thereafter allowed to stand in an atmosphere having a humidity of 85% RH and a temperature of 85° C. further for 1000 hours and then similarly checked for cracking. The panels were also subjected to 300 cycles of thermal shock test wherein each panel was held at 80° C. for 30 min and at −20° C. for 30 min as each cycle, and thereafter checked for cracking. Table 8 shows the results.

TABLE 8

| Panel | Reliability (High Humidity Test) | | Thermal Shock Test |
|---|---|---|---|
| | Temp. 60° C. Humid. 90% 1000 hours | Temp. 80° C. Humid. 80% 1000 hours | |
| Q | No Cracking | No Cracking | No Cracking |
| R | No Cracking | No Cracking | No Cracking |
| S | Cracking | Cracking | Cracking |

Table 8 reveals that no cracking was found under any of the three test conditions in the panels Q to R wherein the first resin substrate 2 was smaller than the second resin substrate 11 in coefficient of thermal expansion, hence satisfactory results. On the other hand, cracking occurred under all the test conditions in the panel S wherein the first resin substrate 2 was greater than the second resin substrate 11 in coefficient of thermal expansion. Incidentally, Table 7 shows that with the panels Q, R, the coefficients of thermal expansion of the first and second resin substrates 2, 11 are at least five times the coefficients of thermal expansion of the first and second electrodes 3, 12, respectively. However, it is seen that cracking can be prevented effectively even in this case.

What is claimed is:

1. A liquid crystal display panel comprising:
    a liquid crystal layer sandwiched between a first resin substrate and a second resin substrate,
    a first electrode and a second electrode provided over respective opposed surfaces of the first and second resin substrates, and
    a first insulating film provided between the first electrode and the liquid crystal layer,
    the product of the film stress of the first electrode and the film thickness thereof being smaller than the product of the film stress of the second electrode and the film thickness thereof.

2. A liquid crystal display panel according to claim 1 wherein a second insulating film is provided between the liquid crystal layer and the second electrode, and the first insulating film is greater than the second insulating film in thickness.

3. A liquid crystal display panel according to claim 1 wherein the product of the film stress of the second electrode and the film thickness thereof is up to about 100 N/m.

4. A liquid crystal display panel according to claim 1 wherein the first electrode comprises a single layer of electrically conductive film, and the second electrode comprises a multiplicity of layers including an electrically conductive film.

5. A liquid crystal display panel according to claim 1 wherein the first electrode and the second electrode are made from the same material, and the first electrode is smaller than the second electrode in thickness.

6. A liquid crystal display panel according to claim 1 wherein the first resin substrate and the second resin substrate are made from the same material.

7. A liquid crystal display panel according to claim 1 wherein the first resin substrate is smaller than the second resin substrate in coefficient of thermal expansion.

8. A liquid crystal display panel according to claim 1 wherein the first electrode comprises an electrically conductive film exhibiting no diffraction peak when subjected to an X-ray analysis, and the second electrode comprises an electrically conductive film exhibiting a diffraction peak when subjected to en X-ray analysis.

9. A liquid crystal display panel according to claim 8 wherein the first electrode and the second electrode comprise ITO.

10. A liquid crystal display panel according to claim 9 wherein the first electrode is higher than the second electrode in the concentration of a tin oxide contained therein.

11. A process for producing a liquid crystal display panel comprising the steps of:
    forming a first electrode and a second electrode respectively over a first resin substrate and a second resin substrate,
    forming a first insulating film over a surface of the first resin substrate having the first electrode thereon, and
    forming a liquid crystal layer by affixing the first resin substrate and the second resin substrate to each other to sandwich a liquid crystal layer therebetween with the first electrode and the second electrode opposed to each other,
    the first electrode and the second electrode being formed from the same metal material by forming the metal material into films at different temperatures in the electrode forming step, the product of the film stress of the first electrode and the film thickness thereof being made smaller than the product of the film stress of the second electrode and the film thickness thereof.

12. A process for producing a liquid crystal display panel according to claim 11 which further comprises the step of forming a second insulating film having a smaller thickness than the first insulating film over a surface of the second resin substrate having the second electrode thereon.

13. A process for producing a liquid crystal display panel comprising the steps of:
    forming a first electrode and a second electrode respectively over a first resin substrate and a second resin substrate,
    forming a first insulating film over a surface of the first resin substrate having the first electrode thereon, and
    forming a liquid crystal layer by affixing the first resin substrate and the second resin substrate to each other to sandwich a liquid crystal layer therebetween with the first electrode and the second electrode opposed to each other,
    the first electrode and the second electrode being formed from the same metal material by forming the metal material into films under different pressures in the electrode forming step, the product of the film stress of the first electrode and the film thickness thereof being made smaller than the product of the film stress of the second electrode and the film thickness thereof.

14. A process for producing a liquid crystal display panel according to claim 13 which further comprises the step of forming a second insulating film having a smaller thickness than the first insulating film over a surface of the second resin substrate having the second electrode thereon.

15. A process for producing a liquid crystal display panel comprising the steps of:

forming a first electrode over a first resin substrate, forming a second electrode over a second resin substrate, forming a first insulating film over a surface of the first resin substrate having the first electrode thereon, and forming a liquid crystal layer by affixing the first resin substrate and the second resin substrate to each other to sandwich a liquid crystal layer therebetween with the first electrode and the second electrode opposed to each other, the first electrode exhibiting no diffraction peak when subjected to an X-ray analysis and being formed by maintaining an electrically conductive film of ITO in an amorphous state in the first electrode forming step, the second electrode exhibiting a diffraction peak when subjected to an X-ray analysis and being formed by crystallizing an electrically conductive film of ITO in the second electrode forming step, the product of the film stress of the first electrode and the film thickness thereof being made smaller than the product of the film stress of the second electrode and the film thickness thereof.

16. A process for producing a liquid crystal display panel according to claim 15 which further comprises the step of forming a second insulating film having a smaller thickness than the first insulating film over a surface of the second resin substrate having the second electrode thereon.

* * * * *

UNITED STATES PATENT AND TRADEMARK OFFICE
CERTIFICATE OF CORRECTION

PATENT NO.    : 6,864,938 B2
DATED         : March 8, 2005
INVENTOR(S)   : Naomi Kaneko et al.

It is certified that error appears in the above-identified patent and that said Letters Patent is hereby corrected as shown below:

Title page,
Item [75], Inventors, change "Yawata" to -- Kyoto --.

Column 16,
Line 21, change "en" to -- an --.

Signed and Sealed this

Sixteenth Day of August, 2005

JON W. DUDAS
*Director of the United States Patent and Trademark Office*